United States Patent

Tanaka et al.

[11] Patent Number: 5,870,666
[45] Date of Patent: Feb. 9, 1999

[54] RADIO CHANNEL ESTIMATION BASED ON BER AND RSSI

[75] Inventors: Masahiko Tanaka; Kenji Okita, both of Tokyo, Japan

[73] Assignee: NEC Corporation, Tokyo, Japan

[21] Appl. No.: 600,023

[22] Filed: Feb. 12, 1996

[30] Foreign Application Priority Data

Feb. 13, 1995 [JP] Japan .................................. 7-023561

[51] Int. Cl.$^6$ ............................................. H04B 17/00
[52] U.S. Cl. .................. 455/67.1; 455/67.7; 455/226.1
[58] Field of Search ................................. 455/33.1, 33.2, 455/34.1, 34.2, 54.1, 54.2, 62, 63, 67.1, 67.7, 134, 277.2, 226.2, 226.3, 226.4, 422, 423, 424, 425, 450, 507, 517, 226.1

[56] References Cited

U.S. PATENT DOCUMENTS 5,117,502  5/1992  Onoda et al. ......................... 455/33.1
5,561,673  10/1996  Takai et al. ......................... 455/277.2
5,640,684  6/1997  Konosu et al. ....................... 455/67.7

Primary Examiner—Reinhard J. Eisenzopf
Attorney, Agent, or Firm—Whitham, Curtis & Whitham

[57] ABSTRACT

A radio channel estimation method includes a combination of BER (bit error rate) estimation and RSSI (received signal strength indicator) estimation. The RSSI and the BER are detected from a received signal through a radio channel, and then the radio channel is estimated based on the RSSI and the BER. A quality of the radio channel is estimated to be degraded unless the BER meets a first criterion and the RSSI meets a second criterion. The BER meets the first criterion when an average number of times during a time period that the BER exceeds a maximum value is smaller than a first threshold value. The RSSI meets the second criterion when an average number of times during a time period that the RSSI is below a minimum value is smaller than a second threshold value.

12 Claims, 2 Drawing Sheets

RADIO CHANNEL ESTIMATION BASED ON BER AND RSSI

BACKGROUND OF THE INVENTION

1. Field of the Invention

The present invention generally relates to radio mobile communication systems, and in particular to a channel estimation method and system for use in a mobile terminal.

2. Description of the Related Art

In a land mobile communication system, generally, a mobile terminal is subject to frequently changing radio conditions because there are many cases where the mobile terminal moves through an area where many buildings are located or moves rapidly through several cells of the cellular system. Therefore, the mobile terminal is provided with a channel estimation capability so as to switch to another radio channel having better communication quality.

The conventional channel estimation is performed based on bit error rates (BERs) detected from a received signal. More specifically, a channel estimator, receiving the BER for a radio channel now in use, counts the number of times during a constant time period that the BER exceeds a maximum permissible value. If the BER count exceeds a predetermined threshold, it is estimated that the communication quality of the radio channel has been degraded, and a channel changing request is transmitted to the nearest base station.

However, according to the conventional channel estimation method, the BER count frequently exceeds the predetermined threshold when a vehicle is moving through a downtown street. The reason is that fading is periodically caused by multipath propagation among the buildings depending on the speed of the vehicle. Therefore, channel changing requests are frequently transmitted to the base station, which performs the channel change each time a channel changing request is received. In other words, when vehicles are moving in the area where many buildings are located, too many hand-over procedures would be required of base stations. This causes the whole cellular system to reduce in channel use efficiency, resulting in a deteriorated connection reliability.

SUMMARY OF THE INVENTION

An object of the present invention is to provide a radio channel estimation method which enables improved channel use efficiency of the mobile communications system.

Another object of the present invention is to provide a radio channel estimation method which achieves the reliable estimation of a radio channel without the need of special circuits.

According to the present invention, the radio channel estimation method includes a combination of BER (bit error rate) estimation and RSSI (received signal strength indicator) estimation. The RSSI and the BER are detected from a received signal through a radio channel, and then the radio channel is estimated based on the RSSI and the BER. More specifically, a communication quality of the radio channel is estimated to be degraded unless the BER meets a first criterion and the RSSI meets a second criterion. The BER meets the first criterion when an average number of times during a predetermined time period that the BER exceeds a predetermined maximum value is smaller than a first threshold value. The RSSI meets the second criterion when an average number of times during a predetermined time period that the RSSI is below a predetermined minimum value is smaller than a second threshold value. In other words, the communication quality of the radio channel is estimated to be degraded when neither the first criterion nor the second criterion is met.

Therefore, a channel change request is transmitted to the base station when neither the first criterion nor the second criterion is met, resulting in the reduced number of times that a radio channel now in use is changed to another channel due to fading. This causes the channel use efficiency to be increased and provides enhanced connection reliability. Further, since the channel estimation is performed based on both the BER and the RSSI, a reliable channel estimation is achieved without the need of special circuits.

DETAILED DESCRIPTION OF THE PREFERRED EMBODIMENTS

Figure 1:
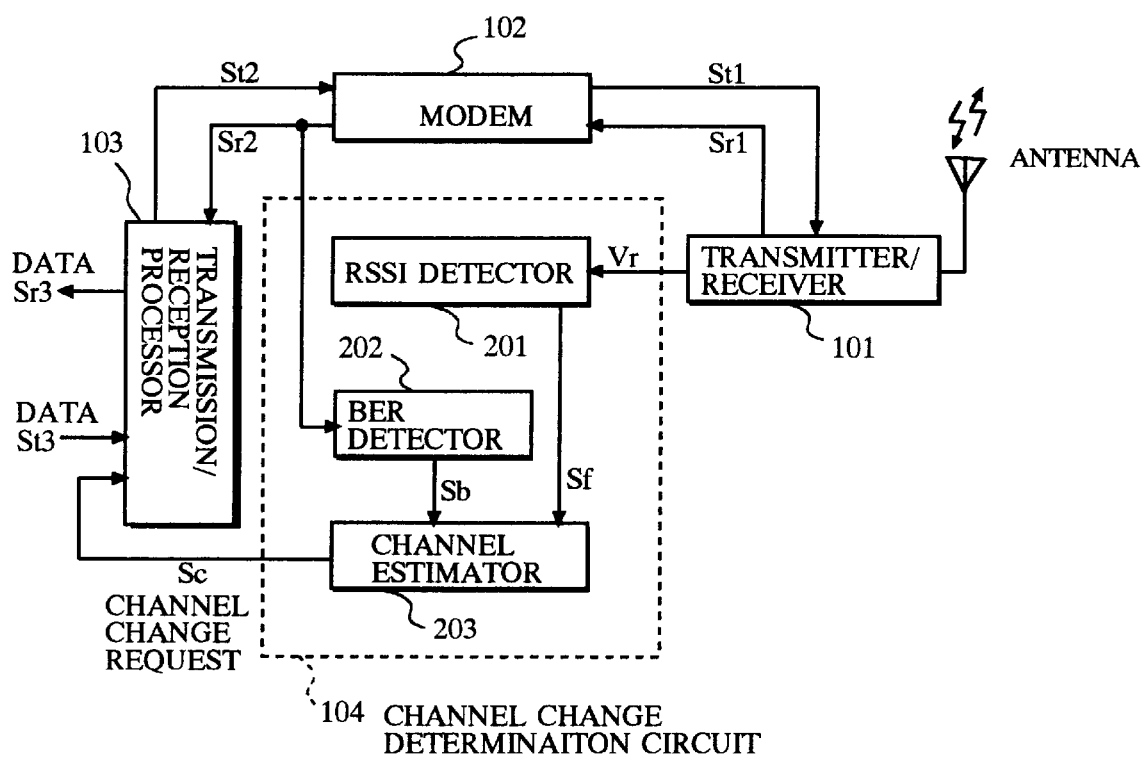
FIG. 1 is a block diagram showing a mobile terminal employing a channel estimation apparatus according to an embodiment of the present invention.

Referring to FIG. 1, a radio mobile terminal such as a digital mobile telephone set is provided with a transmitter-receiver 101, a modulator-demodulator (modem) 102, a transmission-reception data processor 103, and other necessary circuits. A channel reallocation function is also incorporated in these circuits 101–103 which are included in the conventional mobile terminal as well. The radio mobile terminal according to the present invention is further provided with a channel change determination circuit 104 which outputs a channel change request signal Sc to the transmission-reception data processor 103 when the communication quality of an in-use radio channel is estimated to be degraded using received-signal strength signals and bit error rate (BER) signals.

The transmitter-receiver 101 receives a downgoing radio signal from a base station (not shown) through an antenna and demodulates the radio signal into a received baseband signal Sr1 which is output to the modem 102. On the other hand, receiving a transmission baseband signal St1 from the modem 102, the transmitter-receiver 101 modulates a radio-frequency carrier wave according to the transmission baseband signal St1 and transmits an upgoing burst signal to the base station through the antenna. In addition, the transmitter-receiver 101 produces a detected voltage Vr of received signals which varies according to the level of the received signals, and supplies it to the channel change determination circuit 104. A detected current which indicates the varying levels of received signals may be used instead of the detected voltage Vr. The detected voltage Vr is generally obtained in a receiving RF amplifier stage of the transmitter-receiver 101.

The modem 102 demodulates the baseband signal Sr1 received from the transmitter-receiver 101 into received data Sr2 and outputs it to the transmission-reception data processor 103. Further, the modem 102 modulates transmission data St2 received from the transmission-reception data processor 103 into the transmission baseband signal ST1.

The transmission-reception data processor 103 performs necessary operations for data transmission and reception according to a predetermined access scheme including error correction. When receiving the channel change request signal Sc from the channel change determination circuit 104, the transmission-reception data processor 103 adds the channel change request signal Sc and control data to the transmission data St3 and then performs error-correction of the resultant transmission data to output the transmission data St2 to the modem 102. Further, the transmission-reception data processor 103 performs error-correction of the received data Sr2 from the modem 102 and then outputs the received data Sr3 to a following stage (not shown).

The channel change determination circuit 104 is composed of a RSSI (received-signal strength indicator) detector 201, a BER detector 202, and a channel estimator 203, which can be formed with a part of a digital signal processor (DSP). The RSSI detector 201 detects a RSSI signal Sf from the detected voltage Vr received from the transmitter-receiver 101. The BER detector 202 detects a BER signal Sb from the received data Sr2 received from the modem 102. The channel estimator 203 receives the RSSI signal Sf and the BER signal Sb from the RSSI detector 201 and the BER detector 202, respectively, and monitors the communication quality of the radio channel in question as described hereinafter. Needless to say, a central processing unit (not shown) provides the whole control timing of transmission-reception as well as channel change determination.

RADIO CHANNEL ESTIMATION

Figure 2:
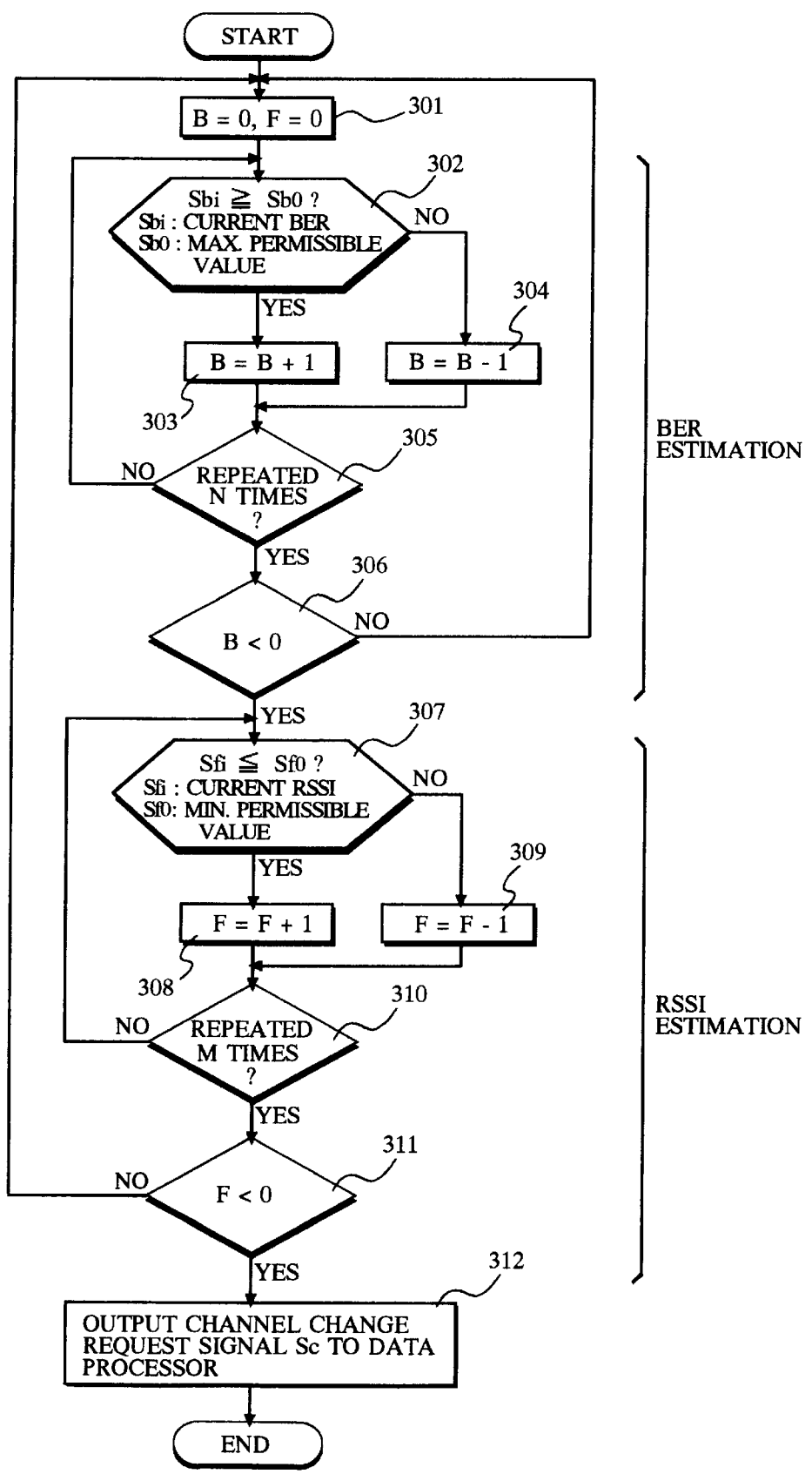
FIG. 2 is a flowchart showing a channel estimation method according to the embodiment.

Referring to FIG. 2, upon receipt of the detected voltage Vr and the received data Sr2, the channel estimator 203 starts estimating the communication quality of the radio channel which is now in use.

First, determination variables B and F are reset to '0' (step 301). The determination variable B indicates the average number of times during a constant time period that the BER is not smaller than a maximum permissible value. The determination variable F indicates the average number of times during a constant time period that the RSSI is smaller than a minimum permissible value. In other words, the determination variables B and F provide criteria for channel estimation.

Receiving a current RSSI signal $Sf_i$ and a current BER signal $Sb_i$ from the RSSI detector 201 and the BER detector 202, respectively, the channel estimator 203 first compares the current BER signal $Sb_i$ with a maximum permissible value $Sb_0$ (step 302). If $Sb_i$ is not smaller than $Sb_0$, that is, the current BER deteriorates, then the determination variable B is incremented by one (step 303) and otherwise the determination variable B is decremented by one (step 304). This BER counting procedure (steps 302–304) is repeated N (a predetermined integer) times during a predetermined time period (step 305). In other word, the BER counting procedure (steps 302–304) is repeated at predetermined intervals of several seconds, for example. The repetition interval is determined depending on the periodic component of multipath fading caused by the mobile terminal moving through the downtown street.

After the BER counting procedure has been repeated N times (Yes of step 305), it is checked whether the determination value B is smaller than '0' (step 306). In this embodiment, if the determination value B is not smaller than '0' (No of step 306), the BER estimation procedure (steps 301–306) is repeated because the BER is estimated not to be degraded. If the determination value B is smaller than '0' (Yes of step 306), the RSSI estimation procedure is started because the BER is estimated to be degraded.

When the determination value B is smaller than '0' (Yes of step 306), the channel estimator 203 compares the current RSSI signal $Sf_i$ with a minimum permissible value $Sf_0$ (step 307). If $Sf_i$ is not greater than $Sf_0$ that is, the current RSSI is degraded, then the determination variable F is incremented by one (step 308) and otherwise the determination variable F is decremented by one (step 309). This RSSI counting procedure (steps 307–309) is repeated M (a predetermined integer) times during a predetermined time period (step 310).

After the RSSI counting procedure has been repeated M times (Yes of step 310), it is checked whether the determination value F is smaller than '0' (step 311). In this embodiment, if the determination value F is not smaller than '0' (No of step 311), the channel estimator 203 determines that the BER has a strong likelihood of recovering in a short time because the RSSI is estimated not to be degraded. Therefore, the channel estimator 203 goes back to the step 301. If the determination value F is smaller than '0' (Yes of step 311), the channel estimator 203 determines that the BER has no possibility of recovering in a short time because the RSSI is also estimated to be degraded. Therefore, the channel estimator 203 outputs the channel change request signal Sc to the transmission-reception data processor 103 (step 312).

In this manner, the mobile terminal is successful in reducing the number of times that channel change requests are transmitted to base stations under circumstances where the BER is frequently degraded due to fading.

What is claimed is:

1. A method for estimating a radio channel in a radio mobile terminal, comprising the steps of:

detecting a received signal strength from a signal received through said radio channel;

detecting a bit error rate from said signal received through said radio channel;

estimating a communication quality of said radio channel based on said detected received signal strength and said detected bit error rate wherein a communication quality of said radio channel is estimated to be degraded when said detected bit error rate does not meet a first criterion and said detected received signal strength does not meet a second criterion, and is estimated to be not degraded when said detected bit error rate does not meet said first criterion and said detected received signal strength does meet said second criterion, wherein said step of estimating a communication quality of said radio channel comprises the steps of:

checking whether said bit error rate meets said first criterion at first time intervals;

checking whether said received signal strength meets said second criterion at second time intervals when said bit error rate does not meet said first criterion, and estimating said radio channel to be degraded when said received signal strength does not meet said second criterion.

2. The method according to claim 1, wherein:

said first criterion is met when an average number of times during a predetermined time period that said bit error rate exceeds a predetermined maximum value is smaller than a first threshold value; and said second criterion is met when an average number of times during a predetermined time period that said received signal strength is below a predetermined minimum value is smaller than a second threshold value.

3. The method according to claim 1, wherein:

said bit error rate does not meet said first criterion when an average number of times during a first time period that said bit error rate exceeds a predetermined maximum value is not smaller than a first threshold value; and said received signal strength does not meet said second criterion when an average number of times during a second time period that said received signal strength is below a predetermined minimum value is not smaller than a second threshold value.

4. The method according to claim 1, further comprising the step of:
transmitting a channel change request to a base station when said communication quality of said radio channel is estimated to be degraded.

5. The method according to claim 1, further comprising the step of:
transmitting a channel change request to a base station when said communication quality of said radio channel is estimated to be degraded.

6. A radio mobile terminal for transmitting and receiving data to and from another radio mobile radio station through a selected radio channel, said radio mobile terminal comprising:
a first detector for detecting a received signal strength from a signal received through said selected radio channel;
a second detector for detecting a bit error rate from said signal received through said selected radio channel;
a channel estimator for estimating a communication quality of said selected radio channel based on said detected received signal strength and said detected bit error rate wherein the communication quality is estimated to be degraded when said detected bit error rate does not meet a first criterion and said detected received signal strength does not meet a second criterion and is estimated to be not degraded when said detected bit error rate does not meet said first criterion and said detected received signal strength does meet said second criterion,
wherein said channel estimator checks whether said detected bit error rate meets said first criterion at first time intervals and then checks whether said detected received signal strength meets said second criterion at second time intervals when said detected bit error rate does not meet said first criterion.

7. The radio mobile terminal according to claim 6, wherein:
said first criterion is met when an average number of times during a predetermined time period that said bit error rate exceeds a predetermined maximum value is smaller than a first threshold value; and
said second criterion is met when an average number of times during a predetermined time period that said received signal strength is below a predetermined minimum value is smaller than a second threshold value.

8. The radio mobile terminal according to claim 6, further comprising:
a transmission controller for transmitting a channel change request to said radio station when said communication quality of said radio channel is estimated to be degraded.

9. The radio mobile terminal according to claim 8, wherein said channel estimator estimates that said detected bit error rate does not meet said first criterion when an average number of time during a first time period that said detected bit error rate exceeds a predetermined maximum value is not smaller than a first threshold value, and estimates that said detected received signal strength does not meet said second criterion when an average number times during a second time period that said detected received signal strength is below a predetermined minimum value is not smaller than a second threshold value.

10. A radio mobile terminal comprising:
a transceiver for transmitting and receiving signals to and from a base station through a selected radio channel, said transceiver having a channel selection function according to a selection signal received from said base station;
a first detector for detecting a received signal strength indicator (RSSI) signal from a signal received through said selected radio channel;
a second detector for detecting a bit error rate (BER) signal from said signal received through said selected radio channel; and
a channel estimator for estimating a communication quality of said selected radio channel based on said RSSI signal and said BER signal wherein the communication quality is estimated to be degraded when said detected BER signal does not meet a first criterion and said detected RSSI signal does not meet a second criterion and is estimated to be not degraded when said detected BER signal does not meet said first criterion and said detected RSSI signal does meet said second criterion, and for outputting a channel change request signal to said base station when said communication quality of said selected radio channel is estimated to be degraded,
wherein said channel estimator checks whether said detected BER signal meets said first criterion at first time intervals and then checks whether said detected RSSI signal meets said second criterion at second time intervals when said detected BER signal does not meet said first criterion.

11. The radio mobile terminal according to claim 10, wherein:
said first criterion is met when an average number of times during a predetermined time period that said BER signal exceeds a predetermined maximum value is smaller than a first threshold value; and
said second criterion is met when an average number of times during a predetermined time period that said RSSI signal is below a predetermined minimum value is smaller than a second threshold value.

12. The radio mobile terminal according to claim 12, wherein said channel estimator estimates that said detected BER signal does not meet said first criterion when an average number of times during a first time period that said detected BER signal exceeds a predetermined maximum value is not smaller than a first threshold value, and estimates that said detected RSSI signal does not meet said second criterion when an average number of times during a second time period that said detected RSSI signal is below a predetermined minimum value is not smaller than a second threshold value.

* * * * *